Feb. 25, 1930.    O. G. EDMOND    1,748,213
MORTISING MACHINE
Filed Feb. 18, 1929    4 Sheets-Sheet 1

Inventor
Oscar G. Edmond
By Herbert E. Smith
Attorney

Feb. 25, 1930.  O. G. EDMOND  1,748,213
MORTISING MACHINE
Filed Feb. 18, 1929   4 Sheets-Sheet 4
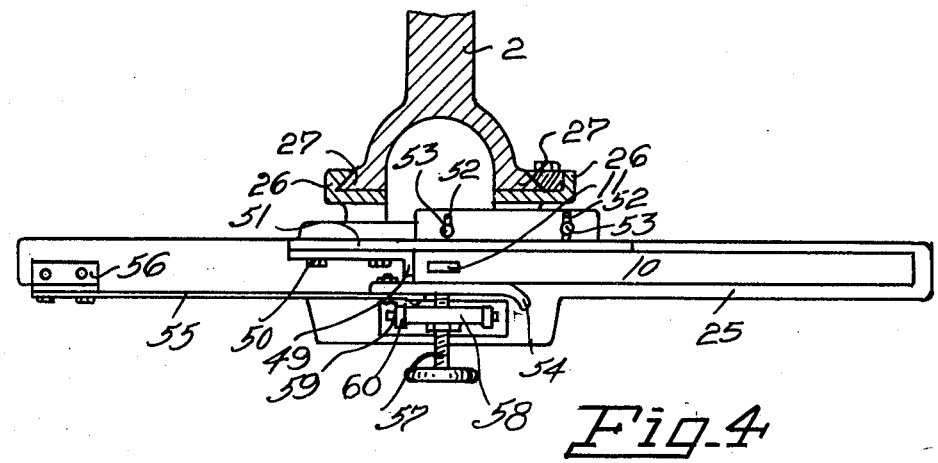
Fig. 4
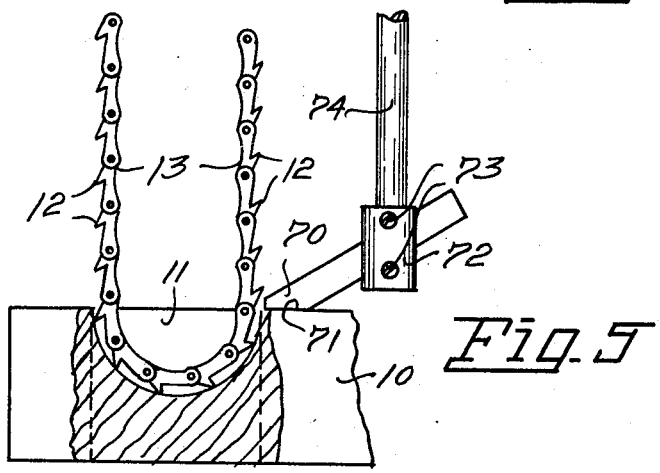
Fig. 5
Fig. 6
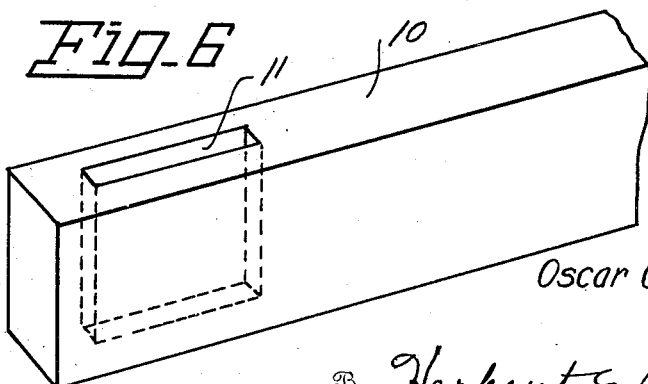
Inventor
Oscar G. Edmond
By Herbert E. Smith
Attorney Patented Feb. 25, 1930

1,748,213

UNITED STATES PATENT OFFICE

OSCAR G. EDMOND, OF SPOKANE, WASHINGTON, ASSIGNOR OF ONE-HALF TO WHITE PINE SASH COMPANY, OF SPOKANE, WASHINGTON

MORTISING MACHINE

Application filed February 18, 1929. Serial No. 341,568.

My present invention relates to improvements in mortising machines in the class of woodworking, and of the chain saw type wherein an endless chain, carrying chisels or cutters, is employed for cutting the slot in blind rails, sash rails, door frames, and similar articles. The chain cutter, or chain saw mortiser, is supported upon stationary bearings, and a reciprocating work support or table is utilized to feed a sash rail, for instance, to the mortiser or chain cutter, and to withdraw the mortised rail from the tool. The work is delivered to the machine by hand, and after the mortising operation is completed the work is removed also by hand, and means operating in synchronism with the chain cutter or chain saw are employed for reciprocating the work support or table, and for clamping the work on the table during the cutting operation. These devices are power operated and they are properly timed for automatic operation as will be described. The invention consists in certain novel combinations and arrangements of parts in the machine whereby a rapid, reliable, and accurate operation of the machine is accomplished, as hereinafter set forth and claimed.

In the accompanying drawings I have illustrated one complete example of the physical embodiment of my invention wherein the parts are combined and arranged according to the best mode I have thus far devised for the practical application of the principles of my invention.

Figure 4 is a top plan view of the reciprocating work support, with a portion of the machine frame in section, and a rail clamped on the table for mortising.

Figure 5 is an enlarged detail view at the operating end of the chain saw or cutter, illustrating the cutting action, and also the use of a presser on the rail to prevent marring or chipping of the mortised rail by the chain saw.

Figure 6 is a perspective view at the mortised end of the rail.

Figure 2:
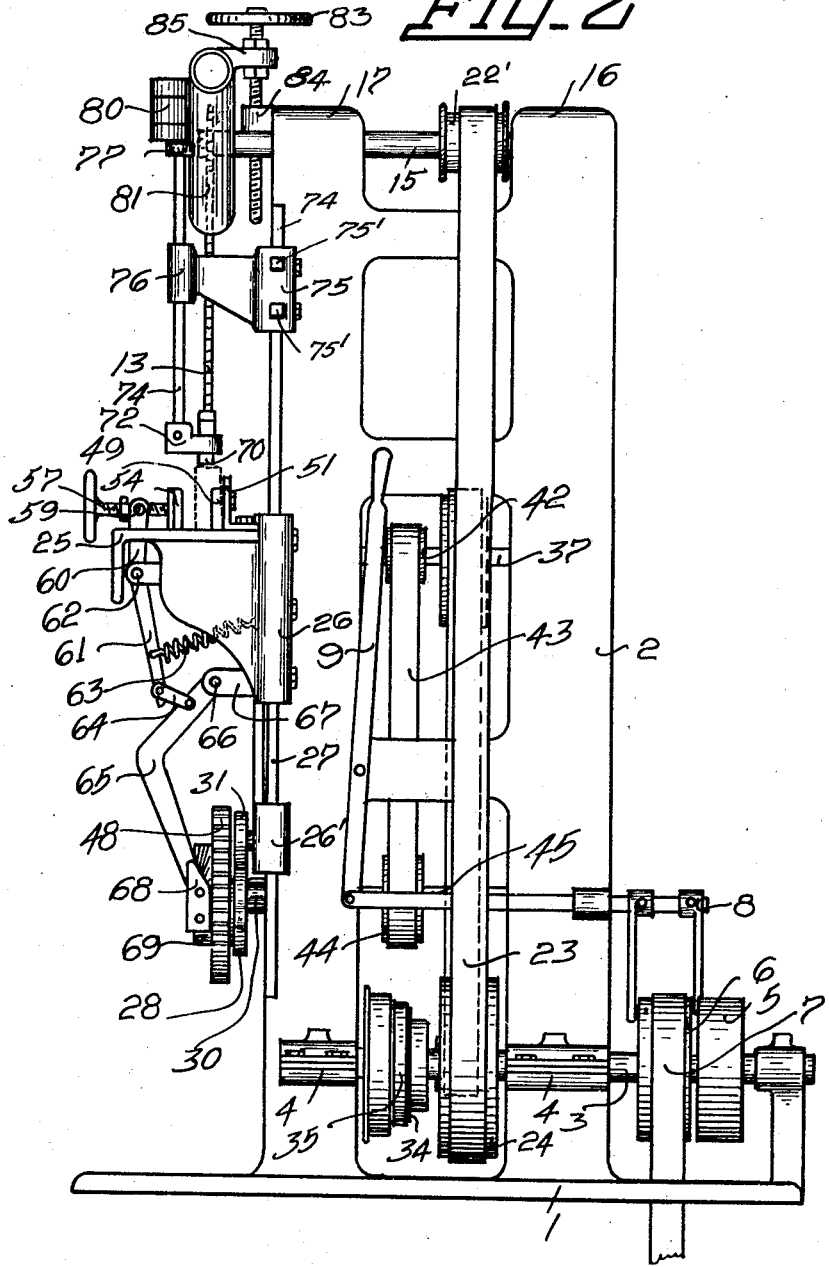
Figure 2 is a side view in elevation, as seen from the right in Figure 1, indicating a rail in dotted lines before it is clamped for the cutting operation.
Figure 3:
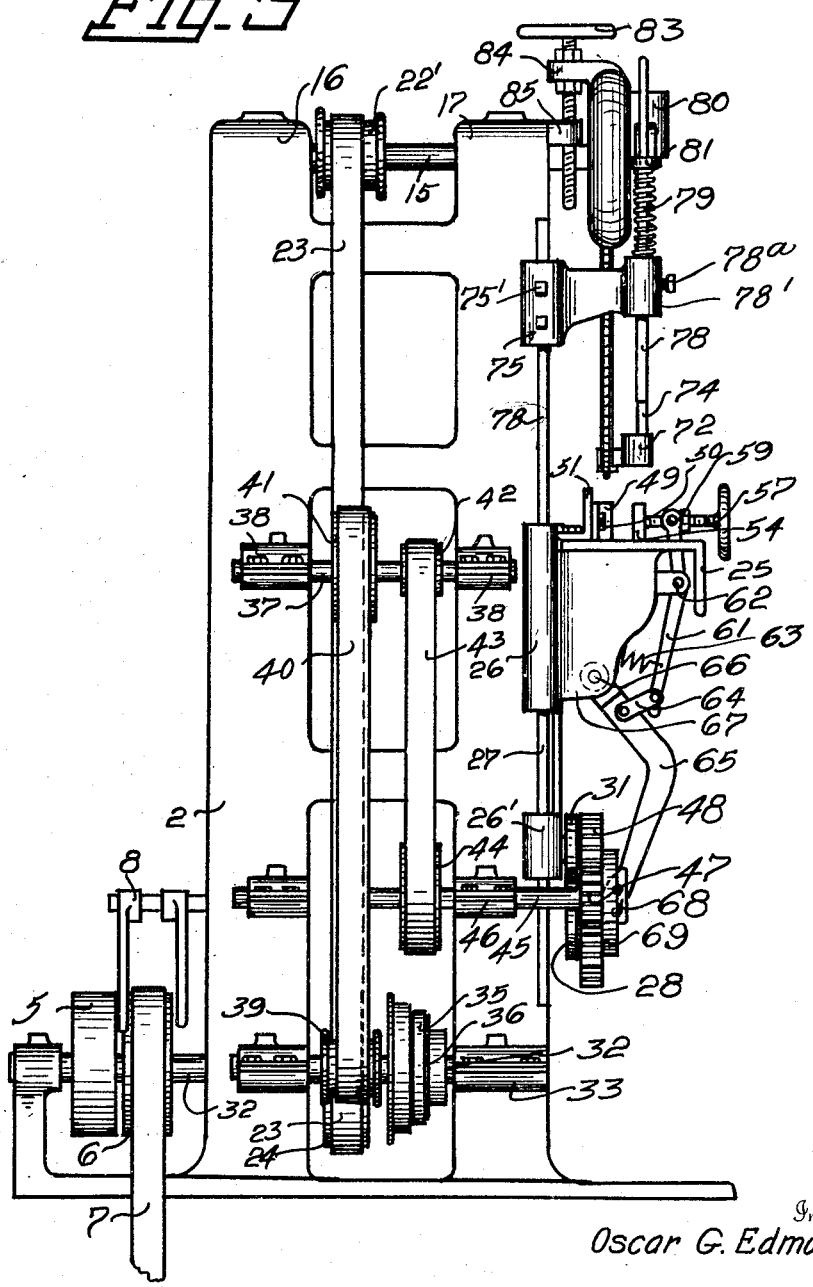
Figure 3 is a side view in elevation, as seen from the left in Figure 1.

In carrying out my invention, the upright machine has a base 1 and main frame 2, and the power shaft 3 which is journaled in bearings 4 of the base or frame is provided with the usual loose pulley 5 and tight pulley 6, driven by the belt 7 from the usual source of power. The belt shifter 8, which is operated by the hand lever 9, in Figure 2, is utilized to control the operation of the machine.

Figure 1:
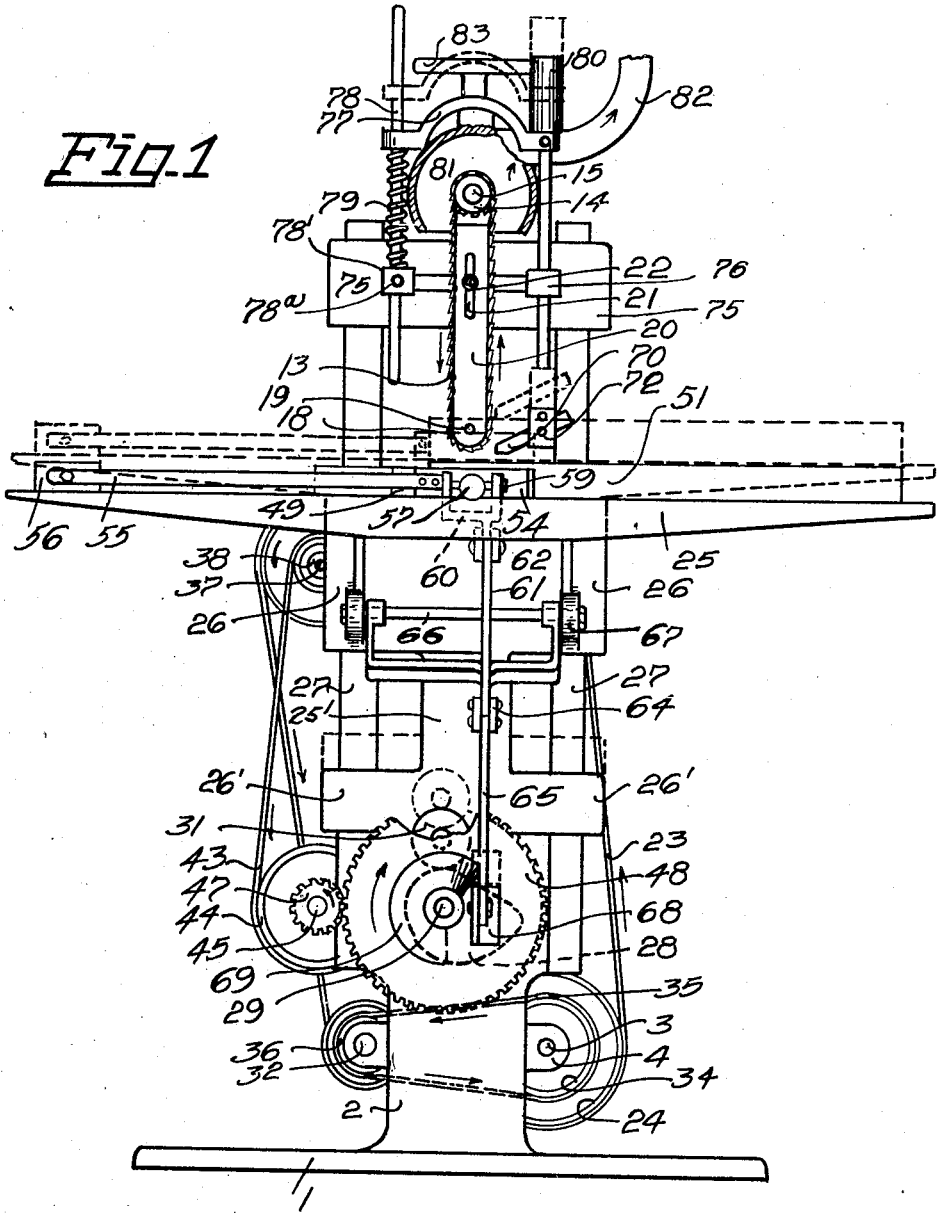
Figure 1 is a view in front elevation of a chain saw mortiser embodying my invention, and showing by dotted lines the rise and fall of the work support.

In order to illustrate the utility of the machine I have shown in Figure 6 a sash rail 10 having a mortise 11 cut therein near one end, and this mortise is fashioned by the action of the chisels or cutters 12 on the endless chain cutter or chain saw 13, the latter moving in the direction of the arrows as indicated in Figure 1.

The chain cutter operates in a vertical plane, and at its upper end it is supported on a driving sprocket wheel 14 mounted on the cutter shaft 15, which shaft is journaled at 16 and 17 in the head or top portion of the machine frame. At its lower end, the endless chain cutter passes around under a guide sprocket wheel 18 mounted on the shaft 19, and the shaft is journaled in the lower end of a guide plate 20 for the chain cutter.

This guide plate 20 for the cutter has a vertical, central, slot 21 therein for the bolt 22 which is secured to the head of the main frame, and it will be apparent that the plate, through its slot and bolt arrangement, may be vertically adjusted with relation to the driving sprocket wheel 14, to maintain the proper tension of the cutter chain, and to compensate for and take up wear on the operating parts. The endless cutter chain is continuously operated at high speed from the power shaft 3 through transmission devices comprising a driving pulley 22' on the cutter shaft 15, the long, upright belt 23, and a large pulley 24, the latter on the power shaft.

The cutting mechanism remains supported in stationary position, and the rail 10 is presented thereto (for cutting the mortise) on the horizontally disposed work table 25 which has a rigid back plate depending therefrom. At its side edges this back plate is fashioned with grooved slides 26, 26 and 26', 26', spaced apart and adapted to slide on the pair of spaced, vertical guideways 27 of the machine. The work support, including the table, rises and falls in a vertical plane, to present the rail to the chain cutter, and to withdraw the rail after the mortise has been fashioned.

For elevating the work support to operative position, and for causing the work to pass upwardly over the chain cutter, as indicated in Figure 5, I employ a cam 28 on the cam shaft 29, journaled in bearings 30 near the bottom of the machine. This shaft is revolved, as will be described, to rotate the cam for co-action with a cam roller or wheel 31 carried by and journaled on the lower end of the plate 25' of the table. The action of the cam on the wheel, and consequent vertical reciprocation of the work support, are indicated by dotted lines in Figure 1, where the table is shown elevated in dotted lines, and lowered in full lines.

To reduce the speed of the operation of the work support, power is transmitted thereto from the power shaft through transmission parts including a lower countershaft 32 journaled in bearings 33 at one side of the machine frame or pedestal, and the latter shaft is driven from the power shaft by a pulley 34, belt 35, and pulley 36 on the countershaft. From the countershaft power is transmitted to a second countershaft 37, journaled in bearings 38 about midway the height of the machine frame, by means of a pulley 39 on the first countershaft and a belt 40 and pulley 41, the latter on the second countershaft. A back drive for the cam shaft 29 comprises a pulley 42 on the second countershaft, belt 43, and a pulley 44 on the gear shaft 45. Gear shaft 45 is journaled in bearings 46 on the frame and it carries a pinion 47 that meshes with a larger gear 48 on the cam shaft 29. By means of these power transmission devices, the speed of the power shaft is properly reduced to the comparatively slow movement of the revolving cam shaft and the reciprocating movement of the work support is actuated therefrom.

A single rail 10 is manually laid on the top of the table 25 of the work support, while the latter is in lowered position, with one end of the rail in contact with a stop or gage plate 49, which plate is located on the top of the work table. This stop and gage is adjustable longitudinally of the work table to gage the distance at which the mortise is to be located from the end of the rail, and the gage is held in adjusted position by bolts 50 which bolts hold the plate to a flanged, stationary clamp plate 51, against which the edge of the rail is placed by hand.

The stationary clamp plate 51 may be adjusted toward the front or rear of the machine to compensate for various thicknesses of rails, by means of the slots 52 and bolts 53, the latter being passed through the slots and threaded into the top of the table 25.

A forwardly and rearwardly movable clamp plate 54 co-acts with the stationary clamp plate 51 for clamping the rail and rigidly holding it during the operation of the chain cutter. This movable clamp plate is shown in open position in Figure 2, and in closed position against a rail in Figure 4, and it is moved laterally of the rail over the table top. The movable clamp plate is urged toward the stationary plate by a flat spring 55 having its free end attached to the plate, and its other end is attached to a bracket 56, which bracket is bolted or screwed to the table 25 near one end, as seen in Figures 1 and 4. The spring exerts a slight pressure to hold the plate 54 against the work or rail, and the spring is yieldable when the front end of the rail encounters and contacts with the flared guiding end of the plate.

The movable clamp plate 54 is shoved or pressed against the rail to clamp the latter between plates 54 and 51, by contact from a clamp screw 57, threaded into a head 58, which head is pivoted at 59 in a yoke 60. This yoke, or U-shaped member, has a depending arm 61 which passes down through an opening in the table top and is provided with a pivotal support 62 in ears rigid with the table plate 25' below the table. A spring 63 is anchored at one end to the plate 25' and its other end is attached to the arm 61 to exert its tension for normally swinging the clamp screw away from the movable clamp plate 54.

At its lower end the lever arm 61 is pivotally connected by a link 64 to a cam lever 65, which lever, at its upper end, is pivoted at 66 to a bracket 67 formed by perforated ears or lugs on the slides 26 of the work support. At its lower end the cam lever is provided with a cam or lug 68 for co-action with a cam wheel or disk 69 carried on the cam shaft 29 in front of the gear wheel 48. As the cam disk 69 revolves with its shaft, the lower free end of the cam lever is swung outwardly from the machine, causing an inward swing of the clamp screw 57, to clamp the clamp plate 54 against the rail. The rail is thus gripped between the clamp plates 54 and 51 to hold the rail rigidly while the work support is being elevated with relation to the chain cutter in the formation of the mortise in the rail. After the mortise is cut and the table and rail fall away from the chain cutter, the clamp screw 57 is withdrawn by spring 63 in co-action with the lever 61, and the clamp plate 54 is pulled away from the rail by its spring 55.

The work support falls away by gravity to free the mortised rail from the chain cutter, and after the rail has been withdrawn from the chain cutter and is released, the rail is removed from the table top by hand, and another rail substituted therefor.

To prevent the chain cutter from splitting, chipping or otherwise marring the wood, of the rail as the chisels 12 emerge from the mortise, a presser foot 70 is employed to bear down upon the top face of the rail at one end of the mortise, as seen in Figure 5. The rail contacts with the presser foot as the former is elevated with the work support, and then the presser foot is also elevated with the rail as the latter is lifted by the work support during the cutting operation.

The presser foot is carried in a head or holder 72, and is clamped therein in adjusted position by means of the set screws 73 in the holder, and the holder is carried by and rigid with an upright bar 74.

At its upper end the machine is equipped with a front cross head 75 which has grooved edges to slide over the upper portions of the spaced guides 27 of the machine, and the cross head may be secured in fixed position on these guides by bolts 75'. This frame supports the chain cutter and it is normally fixed, but the frame may be vertically adjusted with relation to the chain cutter within the limits of the slot 21 of the cutter guide plate 20.

On the cross head is a guide lug 76 through which the rod 74 of the presser foot passes or slides, and on the upper end of the presser bar or rod 74 is carried a yoke 77, which, at its free end has a sliding fit over the fixed guide rod 78. This guide rod is fixed in a socket member 78' of the cross head, by means of a set bolt or screw 78a, and between the free end of the yoke and the socket member 78' a coiled spring 79 is coiled, to act as a shock absorber to check too rapid descent of the presser foot when the work or rail is withdrawn from the table. At the upper end of the presser bar, above the yoke, a weight 80 is carried for the purpose of affording the necessary pressure of the foot on the rail and to assist in returning the presser foot to normal position.

When new material is added to the table and the table is raised to effect the mortise, the new material or rail will first strike the presser foot, and then slide it upwardly as the mortising progresses. Thus the presser foot is provided with a weighted engagement with the rail from the time the mortiser engages the rail until the process is completed and the rail is dropped away from the chain cutter or mortiser.

For disposing of shavings and saw dust created by the chain cutter, a housing 81 is used over the upper end of the chain cutter, and a draft or suction pipe 82 conveys this material to a suitable receptacle. The housing is supported by means of a hand screw 83 threaded in the bearing nut 84 on the housing, and a collar 85 of the housing permits rotation of the screw with consequent raising or lowering of the screw and housing with relation to the chain cutter.

The operation of the machine is controlled by an attendant who manipulates the control lever 9, the machine being properly adjusted to its work by first setting the clamp screw 57, and stationary clamp plates 51, for the width of the rail, after which the functions of the machine are performed automatically with accuracy and speed as the rails are fed and removed manually.

Having thus fully described my invention, what I claim as new and desire to secure by Letters Patent is:—

1. The combination in a mortising machine with a vertically reciprocable work support, of a weighted presser bar slidably supported on the machine and an adjustable presser foot on the bar in the path of movement of the work on the support, a guide rod rigid with the machine, a yoke rigid with the bar and slidable on said rod, and a spring interposed between the yoke and a fixed part of the rod.

2. The combination in a mortising machine with a vertically reciprocable work support, of a cross head adjustable on the machine, a presser bar slidably mounted on the cross head and a stationary, parallel, guide rod supported on the cross head, a weight on the bar, a yoke rigid with the bar and slidable on the rod, a spring interposed between the yoke and the rod-support, and an adjustable presser foot carried by the bar and located in the path of movement of the work on the support.

3. The combination in a mortising machine, of a slidable work support comprising a work table, a spring blade having one end anchored to the table, a clamp plate carried at the free end of the blade, a second clamp plate mounted on the table and an adjustable gage on said plate, and power operated clamping means co-acting with the first clamp plate for clamping the work between said plates.

4. The combination in a mortising machine, of a vertically reciprocable work support comprising a work table, a spring blade having one end anchored to the table, a clamp plate carried at the free end of the blade, a flanged, slotted clamp plate and bolts for securing said plate to the table, a slotted gage plate and bolts for securing said gage plate to the second clamp plate, and power operated means engaging and co-acting with the first clamp plate for clamping the work between the clamp plates.

5. The combination in a mortising machine, of a vertically reciprocable work support comprising a slotted work table, a movable clamp plate yieldably supported on the table against pressure from the work, a stationary clamp plate on the table and a gage adjustable on said plate, a lever arm pivoted in the slotted table and a head carried by said arm, a screw bar mounted in said head and adapted to engage the movable clamp plate, and power operated means for actuating said lever arm to clamp the work between the clamp plates.

6. The combination in a mortising machine, of a vertically reciprocable work support comprising a slotted table, a movable clamp plate yieldably supported on the table against pressure from the work, a stationary clamp plate on the table, a lever arm pivoted in the slotted table and a head carried thereby, a screw bar mounted in the head for contact with the movable plate, a spring connecting said lever arm with the support, a cam lever pivoted on the work support and a link between said cam lever and lever arm, a cam on the cam lever, and cam mechanism for co-action with said cam.

In testimony whereof I affix my signature.

OSCAR G. EDMOND.